US007076978B2

(12) United States Patent
Denby

(10) Patent No.: US 7,076,978 B2
(45) Date of Patent: Jul. 18, 2006

(54) ANTI-THEFT APPARATUS

(76) Inventor: Michael L. Denby, 6643 E. Aster Dr., Scottsdale, AZ (US) 85254

( * ) Notice: Subject to any disclaimer, the term of this patent is extended or adjusted under 35 U.S.C. 154(b) by 82 days.

(21) Appl. No.: 10/738,295

(22) Filed: Dec. 17, 2003

(65) Prior Publication Data

US 2004/0244445 A1    Dec. 9, 2004

Related U.S. Application Data

(63) Continuation-in-part of application No. 10/026,131, filed on Dec. 18, 2001, now abandoned.

(51) Int. Cl.
*G05B 71/00* (2006.01)
(52) U.S. Cl. .............................. 70/233; 70/201; 70/225
(58) Field of Classification Search .................. 70/225, 70/226, 229–233, 201
See application file for complete search history.

(56) References Cited

U.S. PATENT DOCUMENTS

| 4,028,915 | A | * | 6/1977 | Stahl ............................ 70/233 |
| 4,951,487 | A | * | 8/1990 | Sheils Dennis .............. 70/233 |
| 5,339,660 | A | * | 8/1994 | Fell .............................. 70/233 |
| 5,706,679 | A | * | 1/1998 | Zane et al. ..................... 70/18 |
| 5,875,662 | A | * | 3/1999 | Denby et al. ................. 70/233 |
| 6,003,347 | A | * | 12/1999 | Eklund .......................... 70/14 |
| 6,167,735 | B1 | * | 1/2001 | Brown .......................... 70/19 |
| 6,668,605 | B1 | * | 12/2003 | Hengelhaupt et al. ........ 70/236 |
| 2002/0139153 | A1 | * | 10/2002 | Tsai .............................. 70/18 |

* cited by examiner

Primary Examiner—Suzanne Dino Barrett
(74) Attorney, Agent, or Firm—Parsons & Goltry; Michael W. Goltry; Robert A. Parsons

(57) ABSTRACT

Disclosed herein is an axle attached to a bicycle, a locking element carried by the axle, and an open attachment member received over the axle between the locking element and the bicycle. The open attachment member is secured between the locking element and the bicycle, and an antitheft element is coupled to the open attachment member inhibiting unauthorized use of the bicycle.

36 Claims, 6 Drawing Sheets

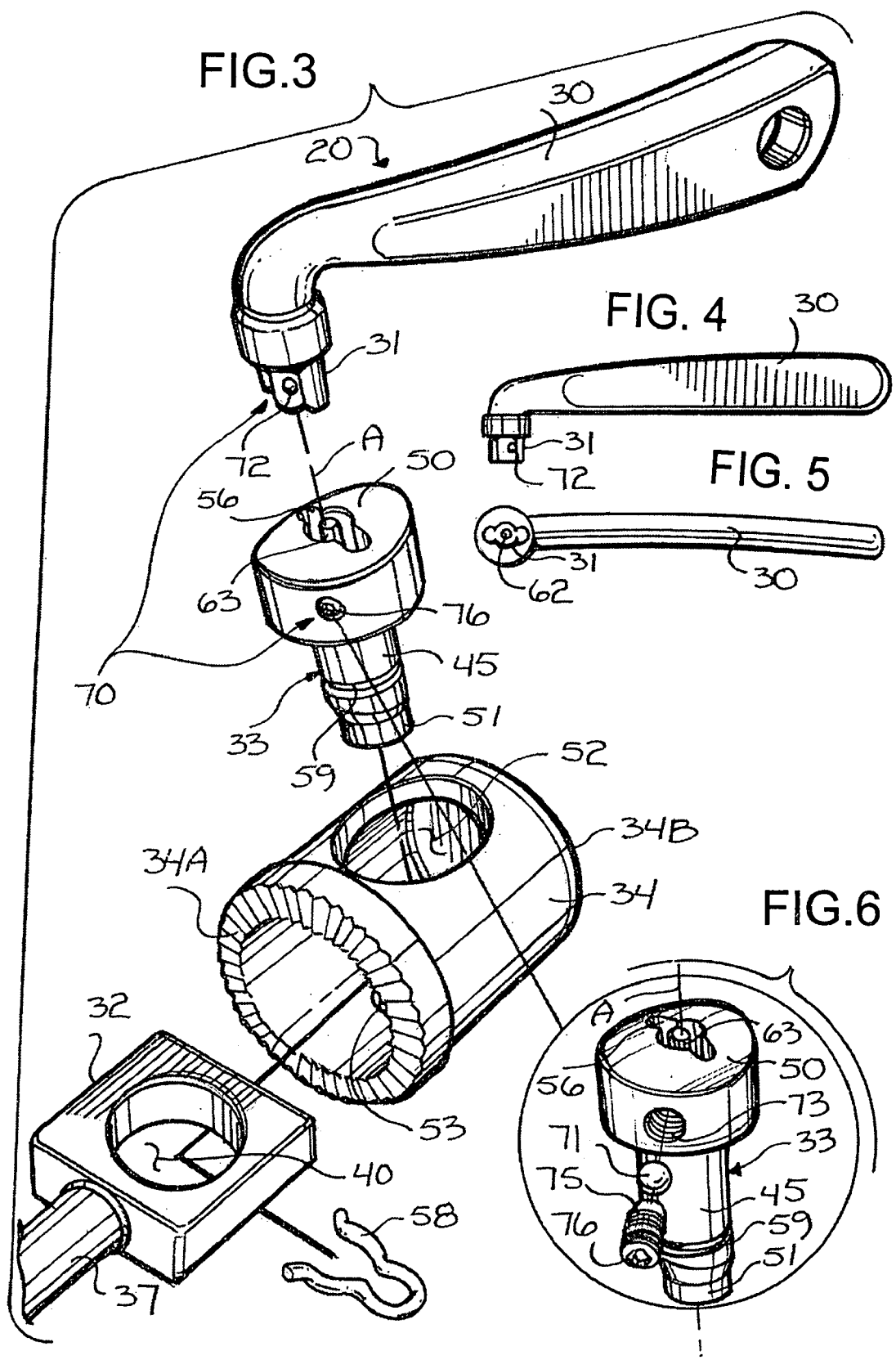

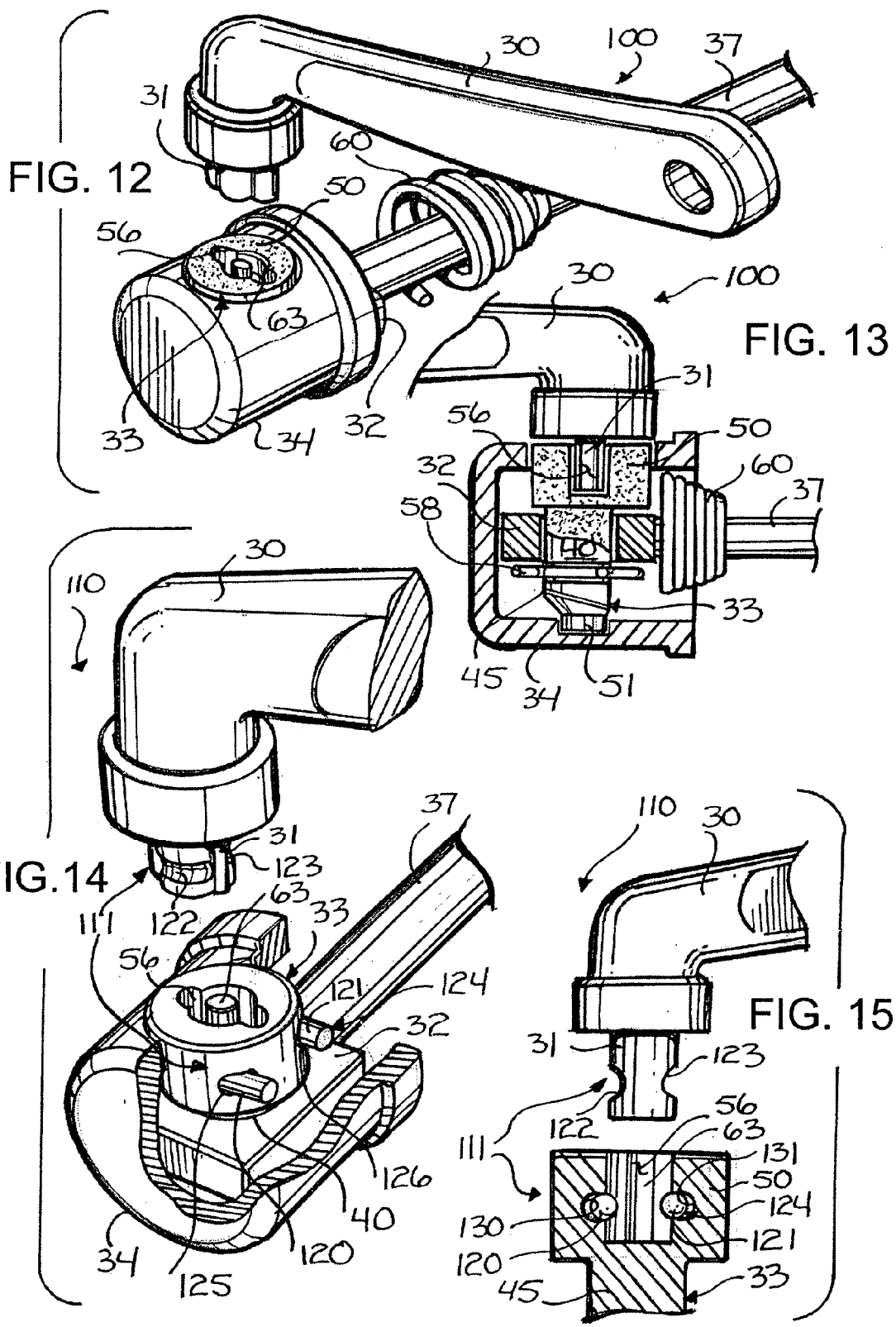

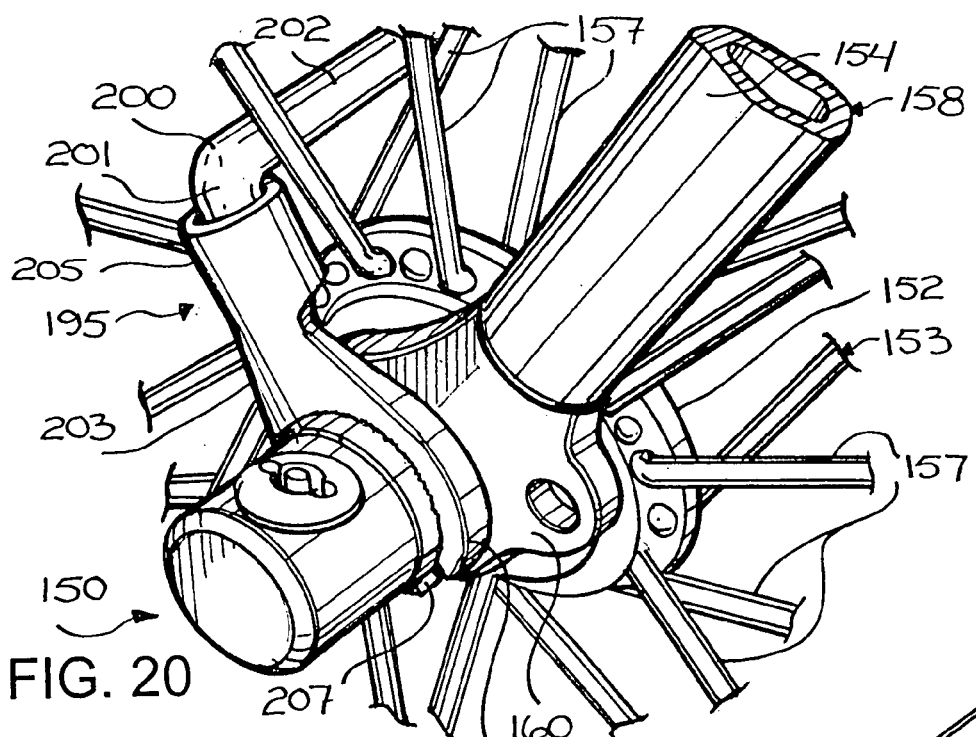
FIG. 20
FIG. 21
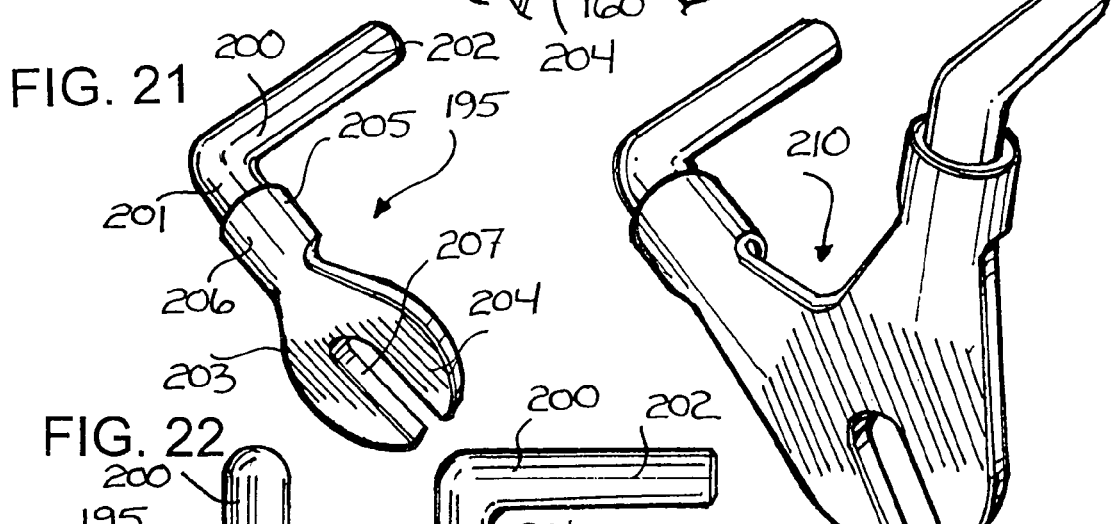
FIG. 22
FIG. 23
FIG. 24
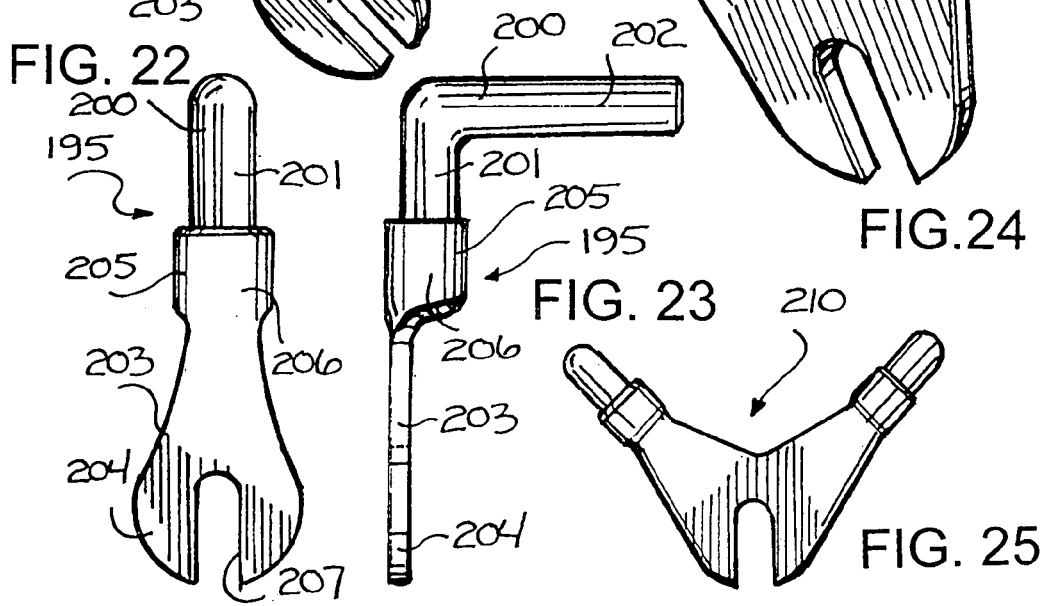
FIG. 25

ANTI-THEFT APPARATUS

CROSS-REFERENCE TO RELATED APPLICATION

This application is a continuation-in-part application of U.S. patent application Ser. No. 10/026,131, filed 18 Dec. 2001 now abandoned.

FIELD OF THE INVENTION

This invention relates to quick release devices for bicycles and to anti-theft devices for use with quick release devices and to other similar assemblies for removably attaching elements to a frame.

BACKGROUND OF THE INVENTION

Many road and mountain bikes incorporate wheels having hubs that are furnished with quick release assemblies that are useful for quickly attaching and detaching the wheels to and from the bicycle frame. Quick release assemblies are also utilized for seat posts and other removable components of bicycles. Most quick release assemblies incorporate a hand-operated lever that interacts with a cam, securing and releasing, for instance, the hub to and from the fork of a bicycle frame in response to operation of the lever. Because quick release assemblies allow removable components such as wheels to be removed from a bicycle frame very quickly, such removable components, especially wheels, are often stolen. Although skilled artisans have devoted considerable effort toward improving the structure and function of quick release assemblies, relatively little effort has been directed toward quick release assemblies that are designed to resist unwanted and unauthorized operation and to associated anti-theft attachments.

Thus, there is a need for a new and improved quick release assembly that is easy to make, easy to use, inexpensive and highly efficient and that incorporates unique features and attachments that prevent theft and unwanted and unauthorized use.

SUMMARY OF THE INVENTION

The above problems and others are at least partially solved and the above purposes and others realized in new and improved preferred embodiments of an invention that relate to antitheft devices for bicycles and other wheeled frameworks. An exemplary apparatus embodiment consists of an axle attached to a bicycle, a locking element carried by the axle, and an open attachment member received over the axle between the locking element and the bicycle. The open attachment member is secured between the locking element and the bicycle. An antitheft element is coupled to the open attachment member inhibiting unauthorized use of the bicycle. In one embodiment, the antitheft element consists of a loop encircling a fixed object adjacent to the bicycle securing the bicycle in place. In another embodiment, there is a wheel rotated to the bicycle, and the antitheft element consists of an abutment disposed to interfere with rotation of the wheel. Further to this embodiment, the open attachment member consists of a body having a first end coupled to the antitheft element and a bifurcated second end defining a slot therein sized to receive the axle between the cap and the bicycle. In a particular embodiment, the axle is attached to a hub secured to the bicycle.

Another apparatus embodiment consists of an axle attached to a bicycle, a locking element carried by the axle, and an open attachment member received over the axle in a fitted position between the locking element and the bicycle. The open attachment member is secured between the locking element and the bicycle. An elongate element has an end coupled to the open attachment member, an opposing end coupled to the bicycle, and an intermediate portion inhibiting unauthorized use of the bicycle. In one embodiment, the intermediate portion is a loop encircling a fixed object adjacent to the bicycle securing the bicycle in place. In another embodiment, there is a wheel rotated to the bicycle, and the intermediate portion is an abutment disposed to interfere with rotation of the wheel. The open attachment member consists of a body having a first end coupled to the antitheft element and a bifurcated second end defining a slot therein sized to receive the axle between the cap and the bicycle. In a particular embodiment, the axle is attached to a hub secured to the bicycle.

Yet another apparatus embodiment consists of an axle, having opposing first and second ends, carried by a bicycle, a first locking element carried by the first end of the axle, a second locking element carried by the second end of the axle, and an open first attachment member received over the axle in a fitted position between the first locking element and the bicycle. The open first attachment member is secured between the first locking element and the bicycle. A second attachment member is secured between the second locking element and the bicycle. An elongate element has an end coupled to the open first attachment member, an opposing end coupled to the second attachment member, and an intermediate portion inhibiting unauthorized use of the bicycle. In one embodiment, the intermediate portion is a loop encircling a fixed object adjacent to the bicycle securing the bicycle in place. In another embodiment, there is a wheel rotated to the bicycle, and the intermediate portion is an abutment disposed to interfere with rotation of the wheel. The open attachment member is a body having a first end coupled to the antitheft element and a bifurcated second end defining a slot therein sized to receive the axle between the cap and the bicycle. In a particular embodiment, the axle is attached to a hub secured to the bicycle.

Yet still another apparatus embodiment consists of a piston, having a bore, carried by an axle attached to a bicycle, a cam having ends held by a cap for rotation in the bore, a handle, a key carried by one of the handle and one of the ends of the cam, a detachably engagable keyway carried by the other of the handle and the one of the ends of the cam, and an open attachment member received over the axle between the cap and the bicycle. The open attachment member is secured between the cap and the bicycle, and an antitheft element is coupled to the open attachment member inhibiting unauthorized use of the bicycle. In one embodiment, the antitheft element consists of a loop encircling a fixed object adjacent to the bicycle securing the bicycle in place. In another embodiment, there is a wheel rotated to the bicycle, and the antitheft element consists of an abutment disposed to interfere with rotation of the wheel. Further to this embodiment, the open attachment member consists of a body having a first end coupled to the antitheft element and a bifurcated second end defining a slot therein sized to receive the axle between the cap and the bicycle. In a particular embodiment, the axle is attached to a hub secured to the bicycle.

A further apparatus embodiment includes a piston, having a bore, carried by an axle attached to a bicycle, a cam having ends held by a cap for rotation in the bore, a handle, a key carried by one of the handle and one of the ends of the cam, a detachably engagable keyway carried by the other of the handle and the one of the ends of the cam, and an open attachment member received over the axle in a fitted position between the cap and the bicycle. The open attachment member is secured between the cap and the bicycle. Further to this embodiment is an elongate element having an end coupled to the open attachment member, an opposing end coupled to the bicycle, and an intermediate portion inhibiting unauthorized use of the bicycle. In one embodiment, the intermediate portion is a loop encircling a fixed object adjacent to the bicycle securing the bicycle in place. In another embodiment, there is a wheel rotated to the bicycle, and the intermediate portion is an abutment disposed to interfere with rotation of the wheel. The open attachment member consists of a body having a first end coupled to the antitheft element and a bifurcated second end defining a slot therein sized to receive the axle between the cap and the bicycle. In a particular embodiment, the axle is attached to a hub secured to the bicycle.

Yet a further apparatus embodiment consists of an axle, having opposing first and second ends, carried by a bicycle, a piston, having a bore, carried by the first end of the axle, a cam having opposing ends held by a cap for rotation in the bore, a handle, a key carried by one of the handle and one of the ends of the cam, a detachably engagable keyway carried by the other of the handle and the one of the ends of the cam, and an open attachment member received over the axle in a fitted position between the cap and the bicycle. The open attachment member is secured between the cap and the bicycle. An attachment member is secured between the second end of the axle and the bicycle with an attachment nut. An elongate element is also provided, which has an end coupled to the open attachment member, an opposing end coupled to the attachment member, and an intermediate portion inhibiting unauthorized use of the bicycle. In one embodiment, the intermediate portion is a loop encircling a fixed object adjacent to the bicycle securing the bicycle in place. In another embodiment, there is a wheel rotated to the bicycle, and the intermediate portion is an abutment disposed to interfere with rotation of the wheel. The open attachment member consists of a body having a first end coupled to the antitheft element and a bifurcated second end defining a slot therein sized to receive the axle between the cap and the bicycle. In a particular embodiment, the axle is attached to a hub secured to the bicycle.

Yet still a further apparatus embodiment consists of an axle, having opposing first and second ends, carried by a bicycle, a piston, having a bore, carried by the first end of the axle, an attachment nut carried by the second end of the axle, a cam having ends held by a cap for rotation in the bore, a handle, a key carried by one of the handle and one of the ends of the cam, a detachably engagable keyway carried by the other of the handle and the one of the ends of the cam, and an open attachment member received over the axle between the attachment nut and the bicycle. The open attachment member is secured between the attachment nut and the bicycle, and an antitheft element is coupled to the open attachment member inhibiting unauthorized use of the bicycle. In one embodiment, the antitheft element is a loop encircling a fixed object adjacent to the bicycle securing the bicycle in place. In another embodiment, there is a wheel rotated to the bicycle, and the antitheft element is an abutment disposed to interfere with rotation of the wheel. The open attachment member consists of a body having a first end coupled to the antitheft element and a bifurcated second end defining a slot therein sized to receive the axle between the attachment nut and the bicycle. In a particular embodiment, the axle is attached to a hub secured to the bicycle.

Another apparatus embodiment consists of an axle, having opposing first and second ends, carried by a bicycle, a piston, having a bore, carried by the first end of the axle, an attachment nut carried by the second end of the axle, a cam having ends held by a cap for rotation in the bore, a handle, a key carried by one of the handle and one of the ends of the cam, a detachably engagable keyway carried by the other of the handle and the one of the ends of the cam, and an open attachment member received over the axle in a fitted position between the attachment nut and the bicycle. The open attachment member is secured between the attachment nut and the bicycle. An elongate element has an end coupled to the open attachment member, an opposing end coupled to the bicycle, and an intermediate portion inhibiting unauthorized use of the bicycle. In one embodiment, the intermediate portion is a loop encircling a fixed object adjacent to the bicycle securing the bicycle in place. In another embodiment, there is a wheel rotated to the bicycle, and the intermediate portion is an abutment disposed to interfere with rotation of the wheel. The open attachment member consists of a body having a first end coupled to the antitheft element and a bifurcated second end defining a slot therein sized to receive the axle between the cap and the bicycle. In a particular embodiment, the axle is attached to a hub secured to the bicycle.

Yet another apparatus embodiment consists of an axle, having opposing first and second ends, carried by a bicycle, a piston, having a bore, carried by the first end of the axle, an attachment nut carried by the second end of the axle, a cam having ends held by a cap for rotation in the bore, a handle, a key carried by one of the handle and one of the ends of the cam, a detachably engagable keyway carried by the other of the handle and the one of the ends of the cam, and an open attachment member received over the axle in a fitted position between the attachment nut and the bicycle. The open attachment member is secured between the attachment nut and the bicycle. An attachment member is secured between the cap and the bicycle. An elongate element has an end coupled to the open attachment member, an opposing end coupled to the attachment member, and an intermediate portion inhibiting unauthorized use of the bicycle. In one embodiment, the intermediate portion is a loop encircling a fixed object adjacent to the bicycle securing the bicycle in place. In another embodiment, there is a wheel rotated to the bicycle, and the intermediate portion is an abutment disposed to interfere with rotation of the wheel. The open attachment member is a body having a first end coupled to the antitheft element and a bifurcated second end defining a slot therein sized to receive the axle between the cap and the bicycle. In a particular embodiment, the axle is attached to a hub secured to the bicycle.

Consistent with the foregoing summary of the invention, and the ensuing specification, which are to be taken together, the invention also contemplates associated apparatus and methods.

BRIEF DESCRIPTION OF THE DRAWINGS

Referring to the drawings:

FIG. 3 is an exploded perspective view of the quick release assembly of FIGS. 1 and 2;

FIG. 4 is a side elevation of the handle of FIG. 3, the opposite side elevation being a mirror image thereof;

FIG. 5 is a bottom plan of the handle of FIG. 3;

FIG. 6 is an exploded perspective view of the cam of FIG. 3 depicting elements of a catch assembly of the invention;

FIG. 12 is a perspective view of another embodiment of a quick release assembly, in accordance with the principle of the invention;

FIG. 13 is a sectional view of the quick release assembly of FIG. 12;

FIG. 14 is a fragmented perspective view of yet another embodiment of a quick release assembly, in accordance with the principle of the invention;

FIG. 15 is a sectional view of a cam of the quick release assembly of FIG. 14 with a key of a handle thereof depicted adjacent the cam;

FIG. 20 is a perspective view of a quick release assembly disposed with a hub that is attached to a wheel and to a frame, each partially depicted, and another embodiment of an attached antitheft, in accordance with the principle of the invention;

FIG. 21 is a perspective view of the antitheft device of FIG. 20;

FIG. 22 is a front elevation of the antitheft device of FIG. 20;

FIG. 23 is a side elevation of the antitheft device of FIG. 20, the opposing side elevation being a substantial mirror image;

FIG. 24 is a perspective view of yet another embodiment of an antitheft device, in accordance with the principle of the invention; and FIG. 25 is a front elevation of the antitheft device of FIG. 24.

DETAILED DESCRIPTION OF PREFERRED EMBODIMENTS

Figure 1:
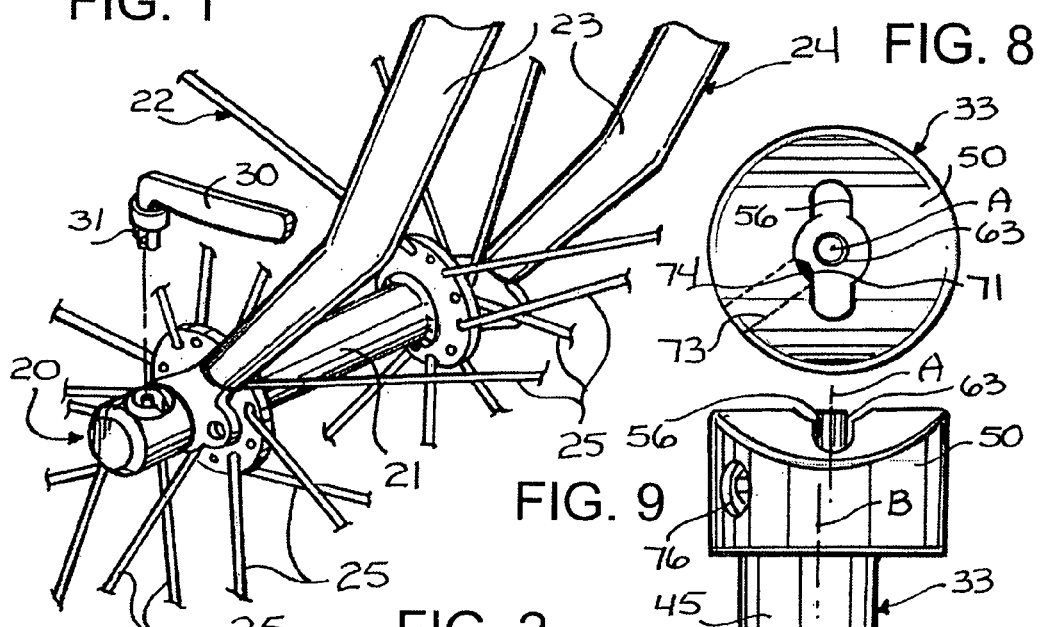
FIG. 1 is a perspective view of a quick release assembly, in accordance with the principle of the invention, the quick release assembly disposed with a hub that is attached to a wheel and to a frame, each partially depicted.

Turning now to the drawings, in which like reference characters indicate corresponding elements throughout the several views, attention is first directed to FIG. 1 in which is seen a perspective view of a quick release assembly 20, embodying the principle of the invention. Assembly 20 is disposed with a hub 21 that is attached to a wheel 22 and to a fork 23 of a frame 24, each partially depicted. In FIG. 1, frame 24 is a bicycle frame of a bicycle, fork 23 is the front fork of frame 24 and wheel 22 is the front wheel of the bicycle. Hub 21 is attached to spokes 25 of wheel 22 in a conventional manner.

Figures 2, 8, 9, 10:
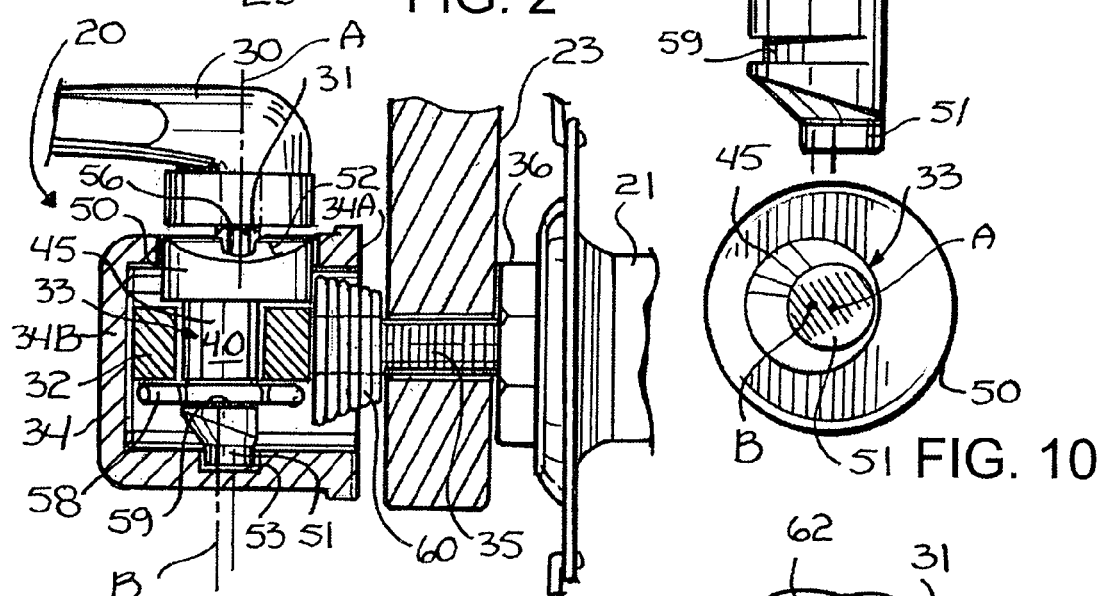
FIG. 2 is a sectional view of the quick release assembly of FIG. 1, the quick release assembly including a handle having a key, a piston having a bore and a cam held by a cap for rotation in the bore and having a keyway that is capable of receiving the key.
FIG. 8 is a top plan of the cam of FIG. 3.
FIG. 9 is a side elevation of the cam of FIG. 3.
FIG. 10 is a bottom plan of the cam of FIG. 3.

Looking to FIGS. 2 and 3, assembly 20 includes handle 30 having a key 31, a piston 32 having a bore 40, a cap 34 having an open end 34A and a closed end 34B, a cam 33 held by cap 34 for rotation in bore 40 and having a keyway 56 that is capable of receiving key 31, and a catch assembly 70 (FIG. 3). FIG. 4 is a side elevation of handle 30, the opposite side elevation being a mirror image thereof. FIG. 5 is a bottom plan of handle 30. With specific regard to FIG. 2, a hollow axle 35 extends through hub 21. A nut 36 threadably secures axle 35 to hub 21, and assembly 20 attaches to axle 35 immediately adjacent fork 23. Open end 34A of cap 34 is directed toward fork 23, and closed end 34B of cap 34 is directed away from fork 23. An axle 37 is slideably disposed through axle 35 and, in this embodiment, is attached to piston 32. Axle 37 is capable of reciprocating through axle 35 and is considered reciprocated to hub 21. Because axle 37 is reciprocated to hub 21, piston 32 is also considered reciprocally mounted. Although not shown by way of illustration, axle 37 extends through and slightly beyond axle 35, and a nut threadably secures this exposed end of axle 37 to fork 23. Bore 40 extends through piston 32 and cap 34 fits over and surrounds piston 32. Cam 33 is rotatably disposed through bore 40 and is rotated to cap 34. Included in cam 33 is a cam body 45 that is rotatably disposed through bore 40 of piston 32. The outer diameter of cam body 45 that extends through bore 40 is slightly less than the inner diameter of bore 40, and this permits cam body 45 to rotate within bore 40. Cam body 45 has opposing ends 50,51 disposed on either side of piston 32 that are held by cap 34 for rotation. End 50 extends into and is held for rotation by an opening 52 of cap 34 and end 51 extends into and is held for rotation by a recess 53 of cap 34 opposing opening 52. End 51 can be fashioned with a recess and cap 34 can be fashioned with an extension or protuberance for rotatably accommodating the recess of end 51 if desired. A clamp 58 located adjacent the underside of piston 32 attaches and secures an annular groove 59 formed into cam 33 proximate end 51, which, in cooperation with piston 32, secures piston 33 to cap 34 preventing it from discharging through opening 52.

End 50 of cam 33 is cylindrical and enlarged relative to cam body 45, and this is readily visualized in FIGS. 2 and 3. End 50 is capable of being rotated in opening 52 and defines an axis of rotation A (FIGS. 2,9,10) that is substantially concentric with the geometric center of opening 52 (FIG. 2). Keyway 56 extends into end 50 and defines a geometric center that is substantially concentric with axis of rotation A, as defined by end 50. Accordingly, the geometric center of keyway 56 is eccentric to cam body 45 and, more particularly, to axis of rotation B. End 50 is considered a key receiving member of cam 33. Cam body 45 is capable of being rotated in bore 40 at its axis of rotation B (FIGS. 2,9,10), which is substantially concentric with the geometric center of bore 40 and eccentric to the geometric center of opening 52. As a result, the geometric center of bore 40 is eccentric to the geometric center of opening 52. A spring 60 is located between fork 23 and piston 32, encircles axle 37 and biases piston 32 away from fork 23 and otherwise toward cap 34.

To secure wheel 22 to fork 23, a cyclist takes up handle 30 and inserts key 31 into keyway 56 of cam 33 as shown in FIG. 2. Rotation of handle 30 rotates cam 33 rotating cam body 45 within bore 40 of piston 32 causing piston 32, cam 33 and cap 34 to move. By selectively rotating cam 33, assembly 20 is capable of being moved between an open position releasing fork 23 and a closed position securing fork 23. Cap 34 is considered a locking element. In the open position of assembly 20, cap 34 is disposed away from fork 23 allowing removal of wheel 22. In the closed position of assembly 20, end 34A of cap 34 bears tightly up against fork 23 preventing removal of wheel 22.

Figure 11:
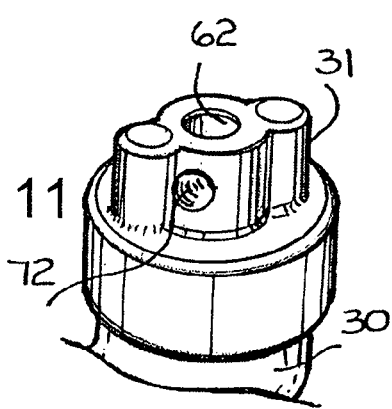
FIG. 11 is an enlarged partial perspective view of the handle of FIG. 3 illustrating the key.

Handle 30 is not provided with an attached cam as with prior art quick release assemblies, but is provided with key 31, which permits handle 30 to function not only to rotate cam 33 as previously explained but also to lock assembly 20 to prevent the likelihood of theft of wheel 22. With regard to FIG. 11, key 31 demonstrates a specific shape and keyway 56 (FIGS. 3,9) is correspondingly shaped to accept key 31. Key 31 and keyway 56 can embody a potentially infinite variety of complementing shapes. In the immediate embodiment, a central blind bore 62 extends into key 31, which is capable of accepting a guide pin 63 disposed centrally of keyway 56.

When assembly 20 is in its closed position securing fork 23, removing handle from assembly 20 prevents wheel 22 from be stolen because unless one has a handle with a duplicate key rotation of cam 33 is not possible and removal of wheel 22 becomes extremely difficult if not impossible. Handle 30 usually removed from assembly 20 when the bicycle is unattended. When the bicycle incorporating assembly 20 is in use, most cyclists prefer to keep handle 30 attached to assembly 20. However, it has been noticed that because there is nothing locking handle 30 to assembly 20, handle 30 is free to fall away from assembly 20, causing it to be lost. In accordance with the principle of the invention, key 31 and cam 33 are furnished with catch assembly 70, which locks key 31 to keyway 56, preventing key 31 from inadvertently falling away from keyway 56 except with a force that is sufficient to overcome the locking action of catch assembly 70.

Figure 7:
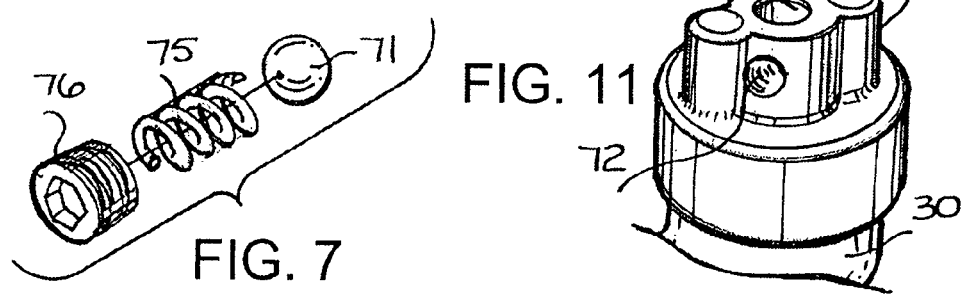
FIG. 7 is an exploded perspective view of the elements of the catch assembly depicted in FIG. 6.

In the immediate embodiment, catch assembly 70 includes a protuberance 71 (FIGS. 6–8) carried by cam 33 and a detachably engagable recess 72 (FIGS. 3,4,11) carried by key 31. Regarding FIG. 6, a bore 73 extends through end 50 of cam 33 to an opening 74 (FIG. 8) leading to keyway 56. Protuberance 71 is located at opening 74, and although opening permits protuberance 71 to extend partially into keyway 56 as depicted in FIG. 8, opening 74 is too small to permit protuberance to fall away from bore 74 into keyway 56. A spring 75 is captured in bore 73 between protuberance 71 and a nut threadably attached to the outer opening leading to bore 73. Spring 75 bears against nut 76 and protuberance 71 and biases protuberance toward or otherwise into keyway 56. Key 31 encounters protuberance 71 when inserted into keyway 56. Exerting a force against key 31 toward keyway 56 that is sufficient to overcome the bias of spring 75 allows key 31 to push protuberance 71 away from keyway 56 forcing it into bore 73 allowing key 31 to pass thereby into keyway 56 until the point when protuberance 71 encounters recess 72. When protuberance 71 encounters recess 72, the bias provided by spring 75 forces protuberance 71 into engagement into and against recess 72 securing key 31 to cam 33, securing handle 30 to cam 33 to prevent handle 30 from inadvertently falling away from cam 30. In this way, a bicycle incorporating assembly 20 can be used and ridden with handle 30 attached without risk of handle 30 inadvertently becoming detached from cam 33. The only way to remove handle 30 is to reverse the foregoing operation by taking up handle 30 and pulling on it with a force that is sufficient 31 to overcome the bias provided by spring 75, detaching protuberance 71 from recess 72. The positioning of protuberance 71 and recess 72 can be reversed, with recess 72 carried by cam 33 at keyway 56 and protuberance 71 carried by key 31 in a fashion like that of cam 33 so as to extend outwardly of, and be biased away from, key 31. Also, although only one protuberance and complementing recess are immediately depicted, any reasonable number of protuberances and complementing recesses can be employed if desired.

In sum, when key 31 is inserted into keyway 56 and protuberance 71 engages recess 72, handle 30 is prevented from falling out of assembly 20. Accordingly, a cyclist can use the bicycle with handle 30 in place. When the cyclist wants to park the bicycle and remove the front wheel, handle 30 may be used to release the wheel from the fork. However, if the cyclist removes handle 30 while the wheel is locked in place to the fork, it would be extremely difficult for someone without the key to remove the wheel.

Attention is now directed to FIGS. 12 and 13, in which there is seen an alternate embodiment of a quick release assembly of the invention, generally designated by the reference character 100. In common with the previously described embodiment designated 20, the immediate embodiment shares handle 30, key 31, piston 32, bore 40 (FIG. 13), axle 37, cap 34, cam 33 including cam body 45 and ends 50 and 51 and keyway 56, clamp 58, spring 60, pin 63 and other common structural components. However, cam 33 is fabricated of magnetic material and key 31 is fabricated of iron or steel. The magnetism of cam 33 has the property of attracting key 31. In this way, a bicycle incorporating assembly 100 can be used and ridden with handle 30 attached without risk of handle 30 inadvertently becoming detached from cam 33, with the magnetic coupling or engagement between key 31 and cam 33 functioning to prevent handle from inadvertently becoming detached from cam 33. The only way to remove handle 30 is to pull on it with a force that is sufficient 31 to overcome the magnetic attraction between key 31 and cam 33, detaching key 31 from cam 33. Key 31 can be constructed from magnetic material and cam 33 from iron or steel if desired. Also, key 31 and cam 33 can each be constructed from magnets if desired for increasing the magnetic attraction between them. The magnetic attraction/engagability between key 30 of handle 30 and cam 33 is considered an alternate embodiment of a catch assembly of the invention. Because key 31 is considered part of handle 30, the magnetic coupling attribute of assembly 100 is considered between and facilitated by handle 30 and cam 33.

In sum regarding assembly 100, when key 31 is inserted into keyway 56 and key 31 of handle 30 is magnetically coupled to cam 33, handle 30 is prevented from falling out of assembly 100. Accordingly, a cyclist can use the bicycle with handle 30 in place. When the cyclist wants to park the bicycle and remove the front wheel, handle 30 may be used to release the wheel from the fork. However, if the cyclist removes handle 30 while the wheel is locked in place to the fork, it would be extremely difficult for someone without the key to remove the wheel.

Attention is now directed to FIGS. 14 and 15, in which there is seen an alternate embodiment of a quick release assembly of the invention, generally designated by the reference character 110. Looking to FIG. 14, and in common with the previously described embodiment designated 20, the immediate embodiment shares handle 30, key 31, piston 32, bore 40, axle 37, cap 34, cam 33 including cam body 45 (FIG. 15), keyway 56, pin 63 and other common structural components. However, assembly 110 is furnished with a catch assembly 111 that includes a pair of protuberances 120,121 carried by cam 33 and a pair of detachably engagable recesses 122,123 carried by key 31. Protuberances 120,121 are elongate, extend into keyway 56 along either side of pin 63 and are the opposing sides of a U-shaped spring 124 attached to cam 33. Spring 124 extends through openings 125,126 formed into and through end 50 of cam 30, which actually blend into recess 130,131 (FIG. 15) located at keyway 56 on either side of pin 63. Protuberances 120,121 reside at recesses 130,131 and are biased toward or otherwise into keyway 56 away from recesses 130,131, respectively. Recesses 122,123 are located on either side of key 31.

Key 31 encounters protuberances 120,121 when inserted into keyway 56. Exerting a force against key 31 toward keyway 56 that is sufficient to overcome the bias of protuberances 120,121 allows key 31 to push protuberances 120,121 away from keyway 56 forcing them into recesses 130,131, respectively, allowing key 31 to pass thereby into keyway 56 until the point when protuberances 120,121 encounter recesses 122,123, respectively. When protuberances 120,121 encounter recesses 122,123, the bias provided by spring 124 forces protuberances 120,121 into engagement into and against recesses 122,123, respectively, clamping and securing key 31 to cam 33, securing handle 30 to cam 33 to prevent handle 30 from inadvertently falling away from cam 30. In this way, a bicycle incorporating assembly 110 can be used and ridden with handle 30 attached without risk of handle 30 inadvertently becoming detached from cam 33. The only way to remove handle 30 is to reverse the foregoing operation by taking up handle 30 and pulling on it with a force that is sufficient 31 to overcome the bias provided by spring 124, detaching protuberances 120,121 from recesses 122,123. The positioning of protuberances 120,121 and recesses 122,123 can be reversed, with recesses 122,123 carried by cam 33 at keyway 56 and protuberances 120,121 (spring 124) carried by key 31 so as to extend outwardly of, and be biased away from, key 31.

In sum, when key 31 is inserted into keyway 56 and protuberances 120,121 engage recesses 122,123, respectively, handle 30 is prevented from falling out of assembly 110. Accordingly, a cyclist can use the bicycle with handle 30 in place. When the cyclist wants to park the bicycle and remove the front wheel, handle 30 may be used to release the wheel from the fork. However, if the cyclist removes handle 30 while the wheel is locked in place to the fork, it would be extremely difficult for someone without the key to remove the wheel.

Figure 16:
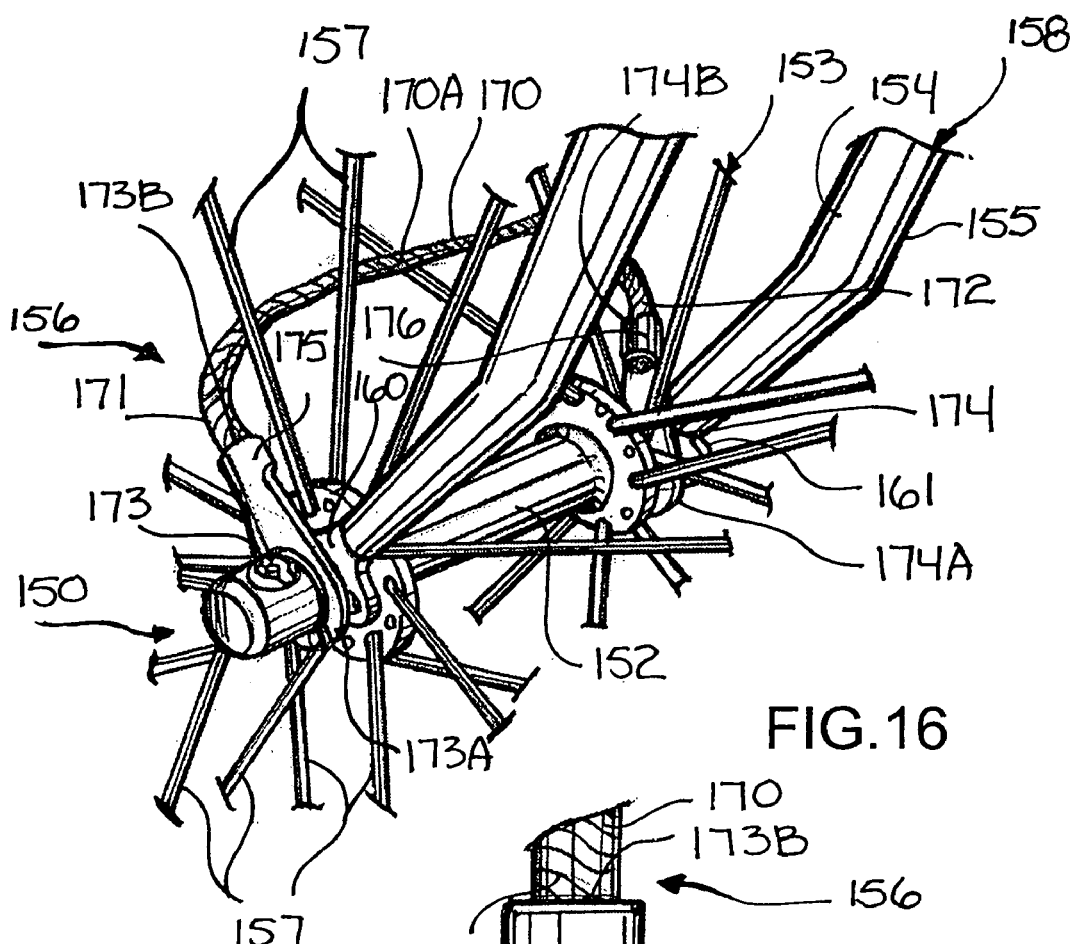
FIG. 16 is a perspective view of a quick release assembly disposed with a hub that is attached to a wheel and to a frame, each partially depicted, and an attached antitheft device, in accordance with the principle of the invention.
Figure 17:
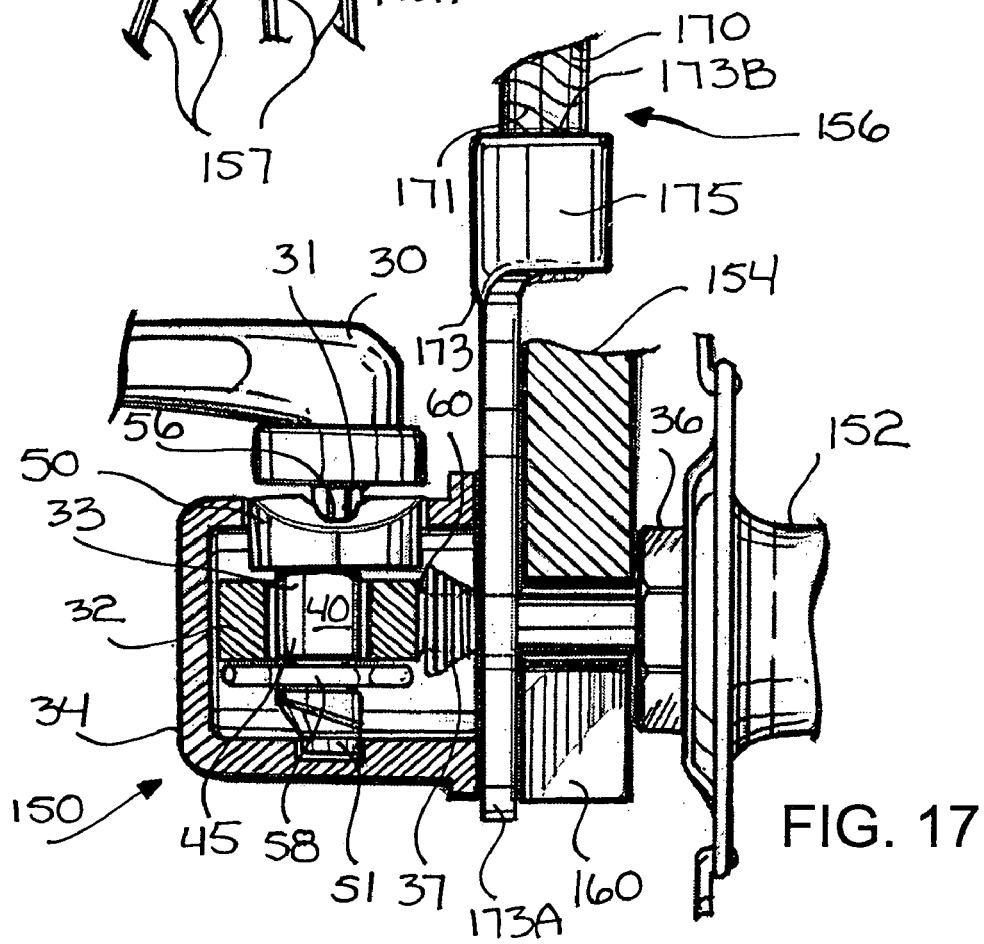
FIG. 17 is a sectional view of the quick release assembly of FIG. 16, the quick release assembly including a handle having a key, a piston having a bore and a cam held by a cap for rotation in the bore and having a keyway that is capable of receiving the key, with an attachment end of the antitheft device shown secured between the cap and the frame.

Attention is now directed to FIGS. 16 and 17, in which there is seen a perspective view of a quick release assembly 150 disposed with a hub 152 that is attached to a wheel 153 and to a fork 154 of a frame 155, each partially depicted, and an antitheft device 156 attached to frame 155 and hub 152 with assembly 150, in accordance with the principle of the invention. Assembly 150 removably secures wheel 153 to frame 155. When assembly 150 secures wheel 153 to frame 155, assembly 150 is attached to frame 155. Wheel 153 is simply an element attached to frame 155. Assembly 150 can be attached to frame 155 at other locations, if desired. Assembly 150 can also be attached to frame 155 at selected locations for, for instance, removably attaching another element to frame 155, such as a seat, another wheel, etc.

Hub 152 can be considered part of or otherwise an extension of frame 155 when it is attached thereto. In FIG. 16, frame 155 is a bicycle frame of a bicycle 158, and yet frame 155 can, in accordance with the present embodiment of the invention, be another type of frame. In the instant embodiment, fork 154 is the front fork of frame 155 and wheel 153 is the front wheel of bicycle 158. Hub 152 is attached to spokes 157 of wheel 153 in a conventional manner. Spokes 157 attach a rim (not shown) to hub 152 in a conventional manner. In common with the previously described embodiment designated 20, assembly 150, as illustrated in FIG. 17, shares handle 30, key 31, piston 32, bore 40, axle 37, cap 34, nut 36, cam 33 including cam body 45 and ends 50 and 51 and keyway 56, clamp 58, spring 60 and other common structural components. Axle 37 extends through and is carried by hub 21. Axle 37 has opposing ends that extend slightly beyond hub 21. Piston 32 is carried by one of the opposing ends of axle 37 and a threaded attachment nut is carried by the other of the opposing ends of axle 37 in a conventional and well known manner. Like cap 34, the attachment nut is considered a locking element.

In attaching frame 155 to hub 152, a free end 160 of fork 154 is disposed on axle 37 between cap 34 and hub 21, receives axle 37 and is secured by and between cap 34 and hub 21, and the other free end 161 (FIG. 16) of fork 154 is disposed on axle 37 between the attachment nut and hub 21, receives axle 37 and is secured by and between the attachment nut and hub 21. To secure wheel 153 to fork 154, a cyclist takes up handle 30 and inserts key 31 into keyway 56 of cam 33. Rotation of handle 30 rotates cam 33 rotating cam body 45 within bore 40 of piston 32 causing piston 32, cam 33 and cap 34 to move. By selectively rotating cam 33, assembly 150 is capable of being moved between an open position releasing fork 154 and a closed position securing fork 154. In the open position of assembly 150, cap 34 and the opposing attachment nut are disposed away from fork 23 allowing removal of wheel 22. In the closed position of assembly 150, cap 34 bears tightly up against free end 160 of fork 154 and the opposing attachment nut bears tightly up against free end 161 of fork 154, preventing removal of wheel 153.

Figure 18:
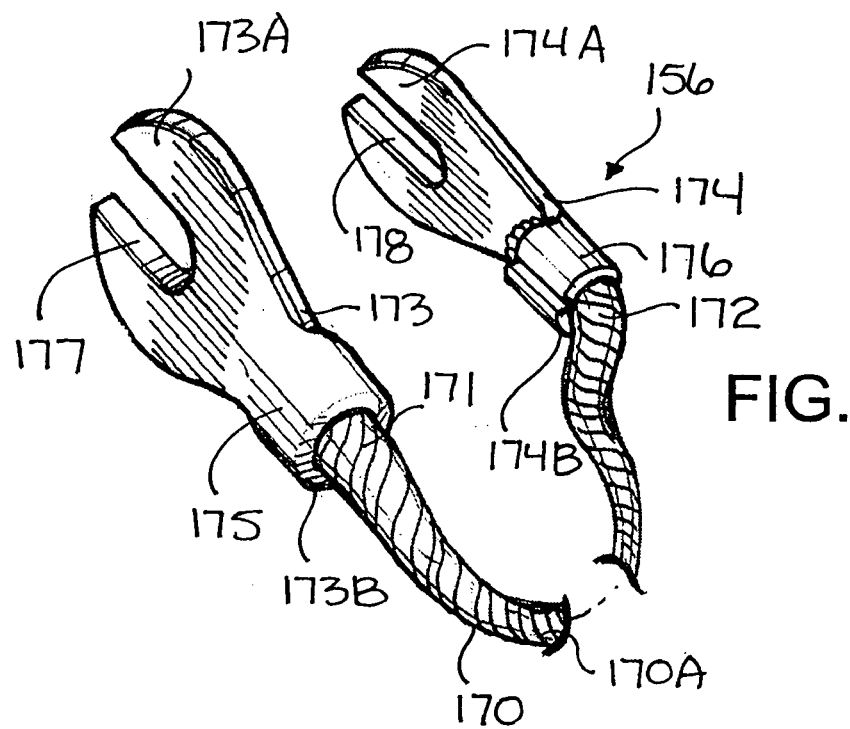
FIG. 18 is a fragmented perspective view of the antitheft device of FIG. 16.

Turning to FIG. 18, device 156 is an antitheft element which consists of an elongate element 170 having opposing ends 171,172 and an intermediate portion therebetween, which is denoted generally at 170A. Ends 171,172 support, and are coupled to, attachment members 173,174, respectively. In this embodiment, attachment members 173,174 are fashioned from steel, and element 170 is cordage fashioned from twisted strands of steel, namely, steel cable. As a result, element 170 is flexible, as is the case with steel cable. Steel cable is rugged and strong. Accordingly, other forms of cable that are similarly strong and rugged can be used. Element 170 can be fashioned from rigid steel if desired, such as steel bar stock. Element 170 can also be fashioned from titanium, aluminum, a selected metal alloy, etc. Element 170 can be any desired length. Attachment members 173,174 have forward ends 173A,174A and rearward ends 173B,174B and sockets 175,176 disposed at rearward ends 173B,174B, respectively. Ends 173B,174B are considered attachment ends. Sockets 175,176 receive and secure ends 171,172, respectively, are crimped against ends 171,172 and also welded thereto for facilitating a rugged engagement. Ends 171,172 can be secured to attachment members 173,174 in other ways. Ends 173A,174A are formed with forwardly disposed slots 177,178, respectively, which are sized to receive therein an element such as an axle. It is to be understood that ends 173A,174A are therefore bifurcated and "open" so as to be capable of receiving an element such as an axle. Accordingly, attachment members 173,174 are considered open attachment members.

Device 156 is capable of being attached to hub 152 with assembly 150 in a number of ways and serves many useful functions, namely, the ability to form a loop into elongate element 170 that can be used for encircling a fixed object adjacent the bicycle for preventing unauthorized use and theft of the bicycle, and the ability to dispose elongate element 170 so as to interfere with rotation of one of wheels of the bicycle for inhibiting unauthorized use and theft of the bicycle. With this in mind, the following discussion is representative of the exemplary teachings of the invention.

Figure 19:
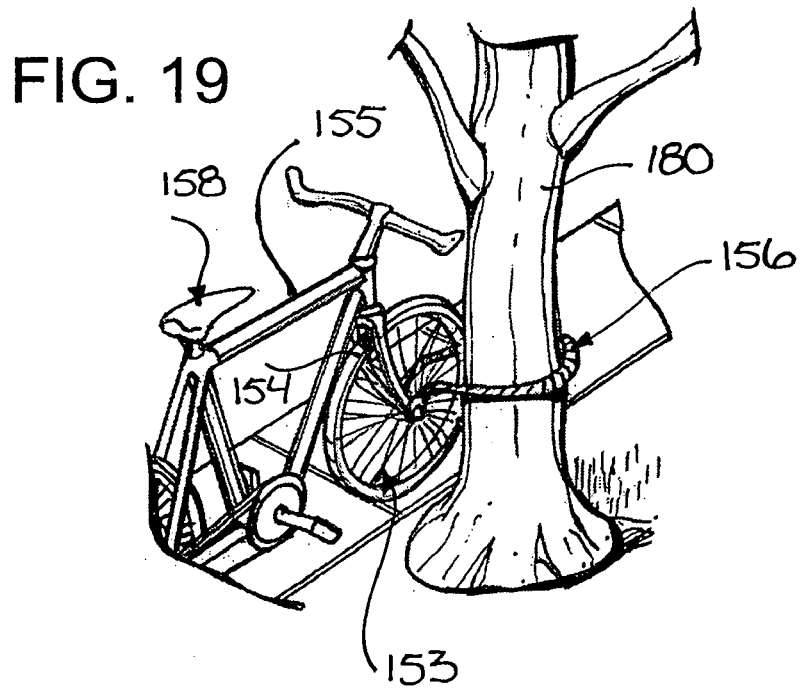
FIG. 19 is a perspective view of an antitheft device like that of FIG. 16 securing a bicycle to a fixed object.

In the open position of assembly 150, one manner of use of device 156 involves attaching device 156 to a bicycle and securing the bicycle to a fixed object with device 156 for inhibiting theft/unauthorized use of the bicycle. One manner of accomplishing this includes disposing attachment member 173 upon axle 37 between cap 34 and free end 160 of fork 154 locating axle 37 in slot 177, forming a loop into intermediate portion as shown and wrapping intermediate portion 170A around a fixed object such as a lamppost, a tree 180 as shown in FIG. 19 or other fixed object, disposing attachment member 174 upon axle 37 between the attachment member and free end 161 of fork 154 locating axle 37 in slot 178, and then closing assembly 150. Because elongate element 170 is preferably cordage, it is capable of being flexed and manipulated allowing a user to wrap it around a fixed object. Intermediate portion 170A can be formed into a loop and wrapped around a fixed object before disposing attachment members 173,174 on axle 37 for securement. In the closed position of assembly 150, attachment member 173 is clamped tightly between cap 34 and free end 160 of fork 154 and attachment member 174 is clamped tightly between the attachment nut and free end 161 of fork 154, preventing removal of not only of wheel 153 but also device 156 and securing bicycle 158 to tree 180 with device 156 thus preventing theft of bicycle 158. By removing key 31 from keyway 56 and reducing handle 30 (and thus key 31) to a secure place such as a pocket or purse, bicycle 158 is essentially secured from theft, because without handle 30 and its attached key 31 it would be very difficult to open assembly 150. Reversing the foregoing operation easily removes device 156 permitting normal use of the bicycle.

Although the immediate example illustrates attachment members 173,174 secured at either side of hub 152 outboard of fork 154, they can be secured inboard of free ends 160,161 of fork between free ends 160,161 and hub 21. Attachments members 173 can also each be together attached and secured between cap 34 and free end 160 of fork 154, or between the attachment nut and free end 161 of fork 154. Attachment members 173,174 can each be disposed at any one of or combination of the foregoing attachment locations. Attachment member 173 can be attached between cap 34 and free end 160 of fork 154, and attachment member 173 attached between the attachment nut and free end 160 of fork 154, and vice versa. It will be understood that only one of attachment members 173,174 can be open, in which the other can be provided as closed, if desired.

A particular embodiment of the invention is attachment members 173,174 attached between cap 34 and free end 160 of fork 154, forming a loop in elongate element 170. In this embodiment, attachment members 173,174 can be considered a single attachment member securing an antitheft loop, namely, elongate element 170 formed into a loop, to the bicycle. And so the invention contemplates a single open attachment member secured between cap 34 and free end 160 of fork 154, and an antitheft loop attached to the single open attachment member.

Another particular embodiment of the invention is attachment members 173,174 attached between the attachment nut and free end 160 of fork 154, forming a loop in elongate element 170. In this embodiment, attachment members 173,174 can be considered a single attachment member securing an antitheft loop, namely, elongate element 170 formed into a loop, to the bicycle. And so the invention contemplates a single open attachment member secured between the attachment nut and free end 160 of fork 154, and an antitheft loop attached to the single open attachment member.

It is within the scope of the invention that one end of device 156 be secured to frame 155 at a selected location, such as to fork 154 or some other location, and the other end of device 156 be furnished with an attachment member that is capable of being secured by assembly 150 as disclosed, and that this arrangement would allow such a device to be employed for encircling a fixed object and disposed so as to prevent a wheel from rotating. As a matter of example, an end of device 156 could be reciprocally secured to frame 155 in a receptacle attached to frame 166 permitting movement of device 156 between a retracted condition so as to be stored and deployed condition permitting the other end of device to be secured with assembly 150.

In the open position of assembly 150, another manner of use of device 156 involves using device 156 to inhibit wheel 153 from rotating for inhibiting unauthorized use of bicycle 158. One manner of accomplishing this includes passing device through spokes 157 disposing intermediate portion 170A between spokes 157 (FIG. 16) with attachment members 173,174 disposed at either side of wheel 153, disposing attachment member 173 upon axle 37 between cap 34 and free end 160 of fork 154 locating axle 37 in slot 177, disposing attachment member 174 upon axle 37 between the attachment member and free end 161 of fork 154 locating axle 37 in slot 178, and then closing assembly 150. In the closed position of assembly 150, attachment member 173 is clamped tightly between cap 34 and free end 160 of fork 154 and attachment member 174 is clamped tightly between the attachment nut and free end 161 of fork 154, preventing removal of not only of wheel 153 but also device 156. With intermediate portion 170A, which is considered an abutment element in this instance, disposed through or otherwise at spokes 157 between fork 154, intermediate portion 170A is capable of interacting with spokes 157 preventing wheel 153 from rotating. By removing key 31 from keyway 56 and reducing handle 30 (and thus key 31) to a secure place such as a pocket or purse, bicycle 158 is essentially secured from unauthorized use, because without handle 30 and its attached key 31 it would be very difficult to open assembly 150. Reversing the foregoing operation removes device 156 permitting normal use of the bicycle. Although the immediate example illustrates attachment members 173,174 secured at either side of hub 152 outboard of fork 154, they can be secured inboard of free ends 160,161 of fork 154 between free ends 160,161 and hub 21. One attachment member can be attached outboard of one of the free ends of the fork and the other inboard of the other of the free ends of the fork if desired. To enhance the frictional engagement of attachment members 173,174, their surfaces can be knurled. In this manner of use, element 170 can be formed of rigid stock, such as rigid steel or other form of rigid, rugged bar stock.

In the open position of assembly 150, still another manner of installment of device 156 includes disposing attachment member 173 upon axle 37 between cap 34 and free end 160 of fork 154 locating axle 37 in slot 177, passing attachment member 174 through spokes 157 from one side of wheel 153 to the other disposing a length of intermediate portion 170A between spokes 157, passing attachment member 174 back between spokes 157 toward attachment member 173 at another location disposing another length of intermediate portion 170A between spokes 157, disposing attachment member 174 next to attachment member 173 upon axle 37 between cap 34 and free end 160 of fork 154 locating axle 37 in slot 178, and then closing assembly 150. In the closed position of assembly 150, attachment members 173,174 is clamped tightly between cap 34 and free end 160 of fork 154, preventing removal of not only of wheel 153 but also device 156. With the lengths of intermediate portion 170A disposed at spokes 157 between the outer extremities of hub 152, the lengths of intermediate portion 170A, which are considered abutment elements, interact with spokes 157 preventing wheel 153 from rotating. Reversing the foregoing operation removes device 156 permitting normal use of the bicycle. This manner of installment can also be employed at the other end of axle 37 with the attachment nut.

Attention is now directed to FIG. 20, in which there is seen a perspective view of a quick release assembly 150 disposed with hub 152 that is attached to wheel 153 and to fork 154 of frame 155 of bicycle 158, each partially depicted, and an antitheft device 195 attached to hub 152 with assembly 150, in accordance with the principle of the invention. Turning to FIG. 21, device 195 includes a generally L-shaped element 200 having an attachment end 201 and an abutment element or end 202 extending away from attachment end 201. An attached attachment member 203 characterizes attachment end 201. Attachment member 203 has a forward end 204, a rearward end 205, and a socket 206 disposed at rearward end 205. Socket 206 receives and secures end 201, is crimped against end 201 and also welded thereto for facilitating a rugged engagement. Element 200 and attachment member 203 are rugged and strong and preferably constructed of steel, titanium, aluminum, a selected metal alloy, or other similarly rugged and strong material and they can be integrally formed if desired. Attachment member 203 is flat and somewhat thin in cross section, and is formed with a forwardly disposed slot 207, bifurcating forward end 204. FIG. 22 illustrates a front elevation of device 195 and FIG. 23 illustrates a side elevation of device 195, the opposite side elevation being a substantial mirror image thereof.

Device 195 is capable of being attached to frame 155 and to hub 152 with assembly 150 in a number of ways and serves the useful function of inhibiting unauthorized use of bicycle 158. In the open position of assembly 150, wherein its structural features are best seen in FIG. 17, one manner of installation and use of device 195 involves disposing attachment member 203 upon axle 37 between cap 34 and free end 160 of fork 154 locating axle 37 in slot 207 directing abutment end 202 through spokes 157 confronting fork 154 as depicted in FIG. 20 and then closing assembly 150. In the closed position of assembly 150, attachment member 203 is clamped tightly between cap 34 and free end 160 of fork 154 preventing removal of not only of wheel 153 but also device 195. Because abutment end 202 extends into or otherwise through spokes 157 confronting fork 154 as depicted in FIG. 20, abutment end 202 interacts with spokes 157 preventing wheel 153 from rotating, which prevents unauthorized use of bicycle 158. By removing key 31 from keyway 56 and reducing handle 30 (and thus key 31) to a secure place such as a pocket or purse, bicycle 158 is essentially secured from unauthorized use, because without handle 30 and its attached key 31 it would be very difficult to open assembly 150. Reversing the foregoing operation removes device 195 permitting normal use of the bicycle. Although the immediate example illustrates attachment member 203 secured between cap 34 and free end 160 of fork 154, it can be similarly secured between free end 161 of fork 154 and the attachment nut if desired. To enhance the frictional engagement of attachment member 203, its surfaces can be knurled.

Although device 195 incorporates only a single abutment end 202, device 195 can be fashioned with more if desired. As a matter of example, FIG. 24 depicts a perspective view of a such a device 210 incorporating two abutment ends. FIG. 25 is a front elevation of device 210. It will be further understood that although devices 156 and 195 are disclosed as employed in connection with a quick release assembly like that of the embodiment designated 20, they can be used in connection with the embodiment designated 100.

It accordance with the invention, it is to be understood that an antitheft device/element of a type for securing a bicycle to a fixed object adjacent to the bicycle, such as a tree, etc., and/or for inhibiting rotation of one of the wheels of the bicycle, is to be attached to a bicycle with an attachment assembly consisting of the combination of one or more open attachment members and assembly 150, as herein described. Other forms of antitheft devices for inhibiting unauthorized use of the bicycle, theft of the bicycle, etc., can be used in accordance with the invention, and attached to a bicycle with the use of one or more of the disclosed open attachment members and assembly 150.

This specification discloses preferred embodiments of the invention. Those skilled in the art will further recognize that changes and modifications may be made to the described embodiments without departing from nature and scope of the invention. Accordingly, any such changes and modifications to the preferred embodiments are intended to be included within the scope of the invention as assessed only by a fair interpretation of the ensuing claims.

The invention claimed is:

1. Apparatus comprising:
   a piston, having a bore, carried by an axle attached to a bicycle;
   a cam having ends held by a cap for rotation in the bore;
   a handle;
   a key carried by one of the handle and one of the ends of the cam;
   a detachably engagable keyway carried by the other of the handle and the one of the ends of the cam;
   an open attachment member received over the axle between the cap and the bicycle;
   the open attachment member secured between the cap and the bicycle;
   an antitheft element coupled to the open attachment member inhibiting unauthorized use of the bicycle; and
   the open attachment member comprises a body having a first end coupled to the antitheft element and a bifurcated second end defining a slot therein sized to receive the axle between the cap and the bicycle.

2. Apparatus of claim 1, wherein the antitheft element comprises a loop encircling a fixed object adjacent to the bicycle securing the bicycle in place.

3. Apparatus of claim 1, further comprising:
a wheel rotated to the bicycle; and
the antitheft element comprising an abutment disposed to interfere with rotation of the wheel.

4. Apparatus of claim 1, wherein the axle is attached to a hub secured to the bicycle.

5. Apparatus comprising:
a piston, having a bore, carried by an axle attached to a bicycle;
a cam having ends held by a cap for rotation in the bore;
a handle;
a key carried by one of the handle and one of the ends of the cam;
a detachably engagable keyway carried by the other of the handle and the one of the ends of the cam;
an open attachment member received over the axle in a fitted position between the cap and the bicycle;
the open attachment member secured between the cap and the bicycle;
an elongate element having an end coupled to the open attachment member, an opposing end coupled to the bicycle, and an intermediate portion inhibiting unauthorized use of the bicycle; and
the open attachment member comprises a body having a first end coupled to the antitheft element and a bifurcated second end defining a slot therein sized to receive the axle between the cap and the bicycle.

6. Apparatus of claim 5, wherein the intermediate portion is a loop encircling a fixed object adjacent to the bicycle securing the bicycle in place.

7. Apparatus of claim 5, further comprising:
a wheel rotated to the bicycle; and
the intermediate portion comprising an abutment disposed to interfere with rotation of the wheel.

8. Apparatus of claim 5, wherein the axle is attached to a hub secured to the bicycle.

9. Apparatus comprising:
an axle, having opposing first and second ends, carried by a bicycle;
a piston, having a bore, carried by the first end of the axle;
a cam having opposing ends held by a cap for rotation in the bore;
a handle;
a key carried by one of the handle and one of the ends of the cam;
a detachably engagable keyway carried by the other of the handle and the one of the ends of the cam;
an open attachment member received over the axle in a fitted position between the cap and the bicycle;
the open attachment member secured between the cap and the bicycle;
an attachment member secured between the second end of the axle and the bicycle with an attachment nut;
an elongate element having an end coupled to the open attachment member, an opposing end coupled to the attachment member, and an intermediate portion inhibiting unauthorized use of the bicycle; and
the open attachment member comprises a body having a first end coupled to the antitheft element and a bifurcated second end defining a slot therein sized to receive the axle between the cap and the bicycle.

10. Apparatus of claim 9, wherein the intermediate portion is a loop encircling a fixed object adjacent to the bicycle securing the bicycle in place.

11. Apparatus of claim 9, further comprising:
a wheel rotated to the bicycle; and
the intermediate portion comprising an abutment disposed to interfere with rotation of the wheel.

12. Apparatus of claim 9, wherein the axle is attached to a hub secured to the bicycle.

13. Apparatus comprising:
an axle, having opposing first and second ends, carried by a bicycle;
a piston, having a bore, carried by the first end of the axle;
an attachment nut carried by the second end of the axle;
a cam having ends held by a cap for rotation in the bore;
a handle;
a key carried by one of the handle and one of the ends of the cam;
a detachably engagable keyway carried by the other of the handle and the one of the ends of the cam;
an open attachment member received over the axle between the attachment nut and the bicycle;
the open attachment member secured between the attachment nut and the bicycle;
an antitheft element coupled to the open attachment member inhibiting unauthorized use of the bicycle; and
the open attachment member comprises a body having a first end coupled to the antitheft element and a bifurcated second end defining a slot therein sized to receive the axle between the attachment nut and the bicycle.

14. Apparatus of claim 13, wherein the antitheft element comprises a loop encircling a fixed object adjacent to the bicycle securing the bicycle in place.

15. Apparatus of claim 13, further comprising:
a wheel rotated to the bicycle; and
the antitheft element comprising an abutment disposed to interfere with rotation of the wheel.

16. Apparatus of claim 13, wherein the axle is attached to a hub secured to the bicycle.

17. Apparatus comprising:
an axle, having opposing first and second ends, carried by a bicycle;
a piston, having a bore, carried by the first end of the axle;
an attachment nut carried by the second end of the axle;
a cam having ends held by a cap for rotation in the bore;
a handle;
a key carried by one of the handle and one of the ends of the cam;
a detachably engagable keyway carried by the other of the handle and the one of the ends of the cam;
an open attachment member received over the axle in a fitted position between the attachment nut and the bicycle;
the open attachment member secured between the attachment nut and the bicycle;
an elongate element having an end coupled to the open attachment member, an opposing end coupled to the bicycle, and an intermediate portion inhibiting unauthorized use of the bicycle; and
the open attachment member comprises a body having a first end coupled to the antitheft element and a bifurcated second end defining a slot therein sized to receive the axle between the cap and the bicycle.

18. Apparatus of claim 17, wherein the intermediate portion is a loop encircling a fixed object adjacent to the bicycle securing the bicycle in place.

19. Apparatus of claim 17, further comprising:
a wheel rotated to the bicycle; and
the intermediate portion comprising an abutment disposed to interfere with rotation of the wheel.

20. Apparatus of claim 17, wherein the axle is attached to a hub secured to the bicycle.

21. Apparatus comprising:
an axle, having opposing first and second ends, carried by a bicycle;
a piston, having a bore, carried by the first end of the axle;
an attachment nut carried by the second end of the axle;
a cam having ends held by a cap for rotation in the bore;
a handle;
a key carried by one of the handle and one of the ends of the cam;
a detachably engagable keyway carried by the other of the handle and the one of the ends of the cam;
an open attachment member received over the axle in a fitted position between the attachment nut and the bicycle;
the open attachment member secured between the attachment nut and the bicycle;
an attachment member secured between the cap and the bicycle;
an elongate element having an end coupled to the open attachment member, an opposing end coupled to the attachment member, and an intermediate portion inhibiting unauthorized use of the bicycle; and
the open attachment member comprises a body having a first end coupled to the antitheft element and a bifurcated second end defining a slot therein sized to receive the axle between the cap and the bicycle.

22. Apparatus of claim 21, wherein the intermediate portion is a loop encircling a fixed object adjacent to the bicycle securing the bicycle in place.

23. Apparatus of claim 21, further comprising:
a wheel rotated to the bicycle; and
the intermediate portion comprising an abutment disposed to interfere with rotation of the wheel.

24. Apparatus of claim 21, wherein the axle is attached to a hub secured to the bicycle.

25. Apparatus comprising:
an axle attached to a bicycle;
a locking element carried by the axle;
an open attachment member received over the axle between the locking element and the bicycle;
the open attachment member secured between the locking element and the bicycle;
an antitheft element coupled to the open attachment member inhibiting unauthorized use of the bicycle; and
the open attachment member comprises a body having a first end coupled to the antitheft element and a bifurcated second end defining a slot therein sized to receive the axle between the cap and the bicycle.

26. Apparatus of claim 25, wherein the antitheft element comprises a loop encircling a fixed object adjacent to the bicycle securing the bicycle in place.

27. Apparatus of claim 25, further comprising:
a wheel rotated to the bicycle; and
the antitheft element comprising an abutment disposed to interfere with rotation of the wheel.

28. Apparatus of claim 25, wherein the axle is attached to a hub secured to the bicycle.

29. Apparatus comprising:
an axle attached to a bicycle;
a locking element carried by the axle;
an open attachment member received over the axle in a fitted position between the locking element and the bicycle;
the open attachment member secured between the locking element and the bicycle;
an elongate element having an end coupled to the open attachment member, an opposing end coupled to the bicycle, and an intermediate portion inhibiting unauthorized use of the bicycle; and
the open attachment member comprises a body having a first end coupled to the antitheft element and a bifurcated second end defining a slot therein sized to receive the axle between the cap and the bicycle.

30. Apparatus of claim 29, wherein the intermediate portion is a loop encircling a fixed object adjacent to the bicycle securing the bicycle in place.

31. Apparatus of claim 29, further comprising:
a wheel rotated to the bicycle; and
the intermediate portion comprising an abutment disposed to interfere with rotation of the wheel.

32. Apparatus of claim 29, wherein the axle is attached to a hub secured to the bicycle.

33. Apparatus comprising:
an axle, having opposing first and second ends, carried by a bicycle;
a first locking element carried by the first end of the axle;
a second locking element carried by the second end of the axle;
an open first attachment member received over the axle in a fitted position between the first locking element and the bicycle;
the open first attachment member secured between the first locking element and the bicycle;
a second attachment member secured between the second locking element and the bicycle;
an elongate element having an end coupled to the open first attachment member, an opposing end coupled to the second attachment member, and an intermediate portion inhibiting unauthorized use of the bicycle; and
the open attachment member comprises a body having a first end coupled to the antitheft element and a bifurcated second end defining a slot therein sized to receive the axle between the cap and the bicycle.

34. Apparatus of claim 33, wherein the intermediate portion is a loop encircling a fixed object adjacent to the bicycle securing the bicycle in place.

35. Apparatus of claim 33, further comprising:
a wheel rotated to the bicycle; and
the intermediate portion comprising an abutment disposed to interfere with rotation of the wheel.

36. Apparatus of claim 33, wherein the axle is attached to a hub secured to the bicycle.

* * * * *